Oct. 16, 1951 E. E. RISSLAND 2,571,613
DEVICE FOR TEACHING PERSPECTIVE
Filed July 8, 1946 4 Sheets-Sheet 4

INVENTOR.
Edwin E. Rissland
BY
ATTORNEYS

Patented Oct. 16, 1951

2,571,613

UNITED STATES PATENT OFFICE 2,571,613

DEVICE FOR TEACHING PERSPECTIVE

Edwin E. Rissland, Newark, N. J.

Application July 8, 1946, Serial No. 681,855

2 Claims. (Cl. 35—26)

This invention relates to apparatus for use in demonstrating and teaching the theory of perspective drawings.

One object of the invention is the provision of a device of this character which comprises a portable case for housing all of the elements used in the demonstration when not in use, the said casing also forming the supporting structure for the ground and picture planes when the device is being used.

Another object of the invention is to provide means for tiltingly supporting the transparent picture plane so as to adapt the device for use in demonstrating the theory of perspectives of objects viewed at such a steep angle as to call for the use of a vanishing point for vertical lines.

A further object of the invention is to provide adjustable picture plane supporting and clamping means so as to adapt same for supporting a plurality of suitably alined superposed picture planes or sheets.

Another object of the invention is to produce a device of the character described in which the maximum simplicity of construction and operation is secured.

Other objects, novel features and advantages will appear as the nature of the improvements is better understood, the invention consisting substantially in the novel arrangement and co-relation of parts herein fully described, and illustrated in the accompanying drawings, wherein similar reference characters are used to denote corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In carrying out a preferred form of the invention, it was found advantageous to provide a relatively flat case having a hinged cover provided with cut outs along two opposite parallel edges, so as to permit of the erection and hinged support of the picture plane holding and clamping means, the hinged cover itself acting as the base or support for the ground plane.

Figure 1:
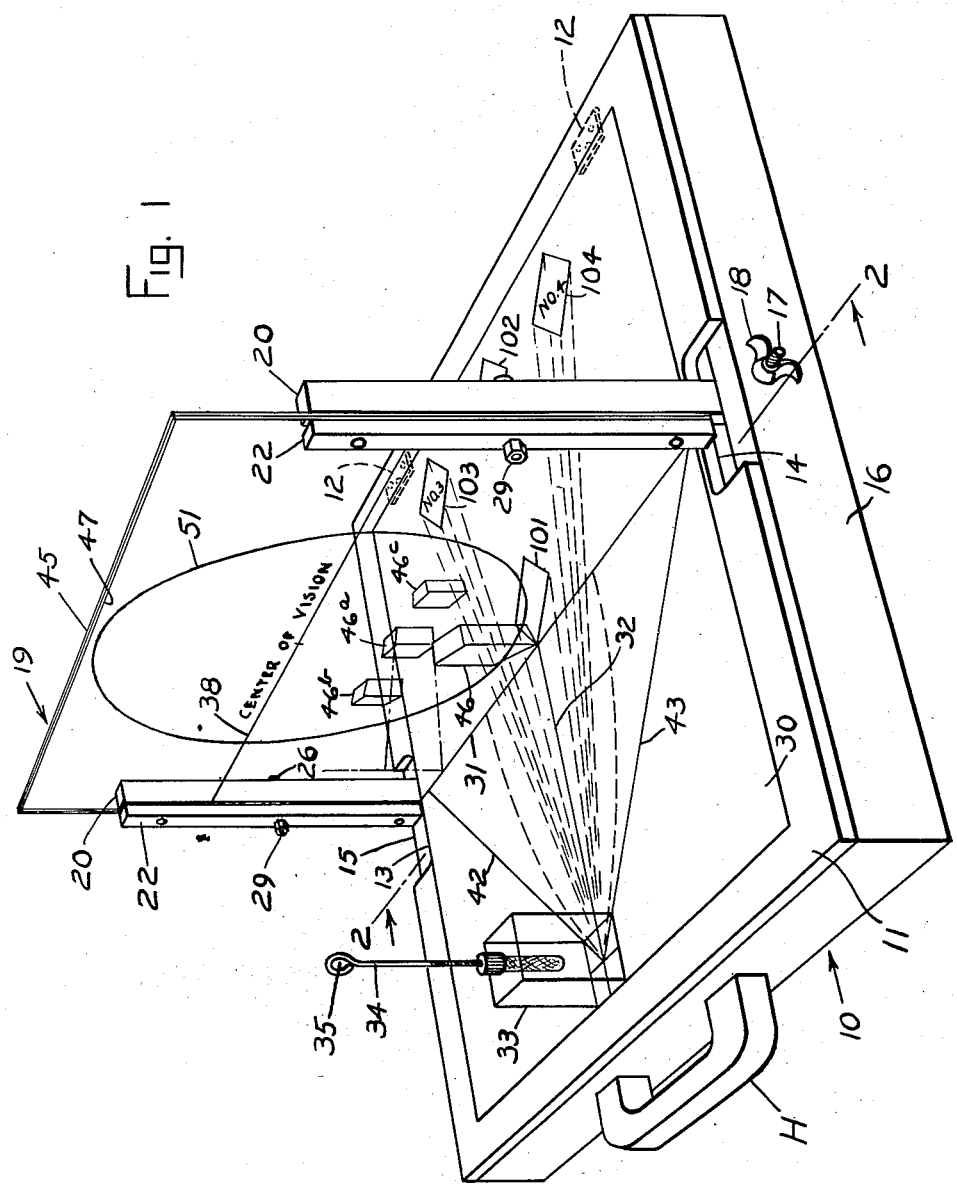
Figure 1 is a perspective view of a demonstrating device made in accordance with a preferred form of the invention.
Figure 2:
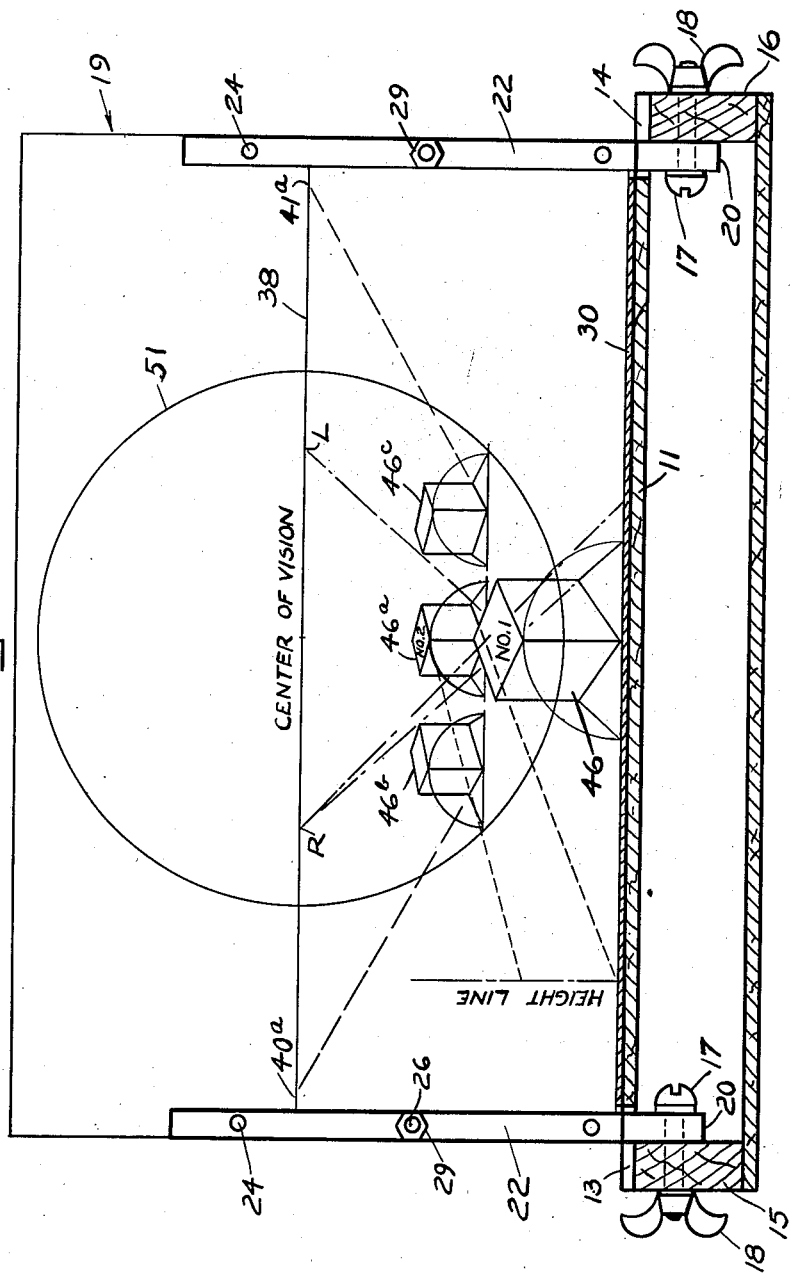
Figure 2 is a cross sectional view taken along line 2—2 of Figure 1.
Figure 3:
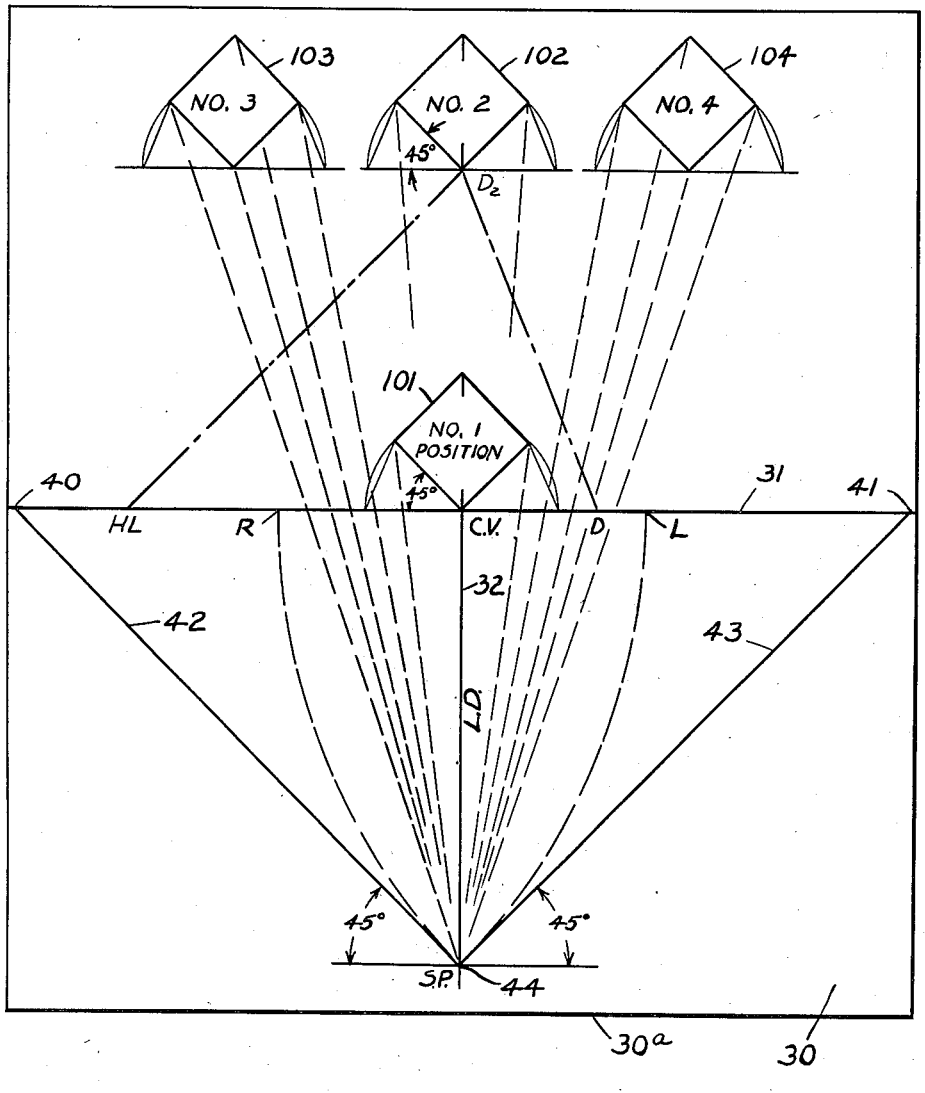
Figure 3 is a top plan or face view of one of the ground plane drawings used in demonstrating a 45 degree angular perspective.
Figure 4:
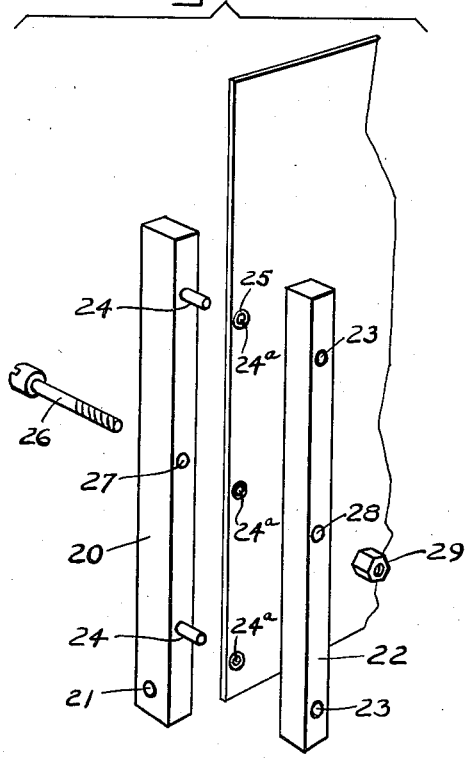
Figure 4 is an exploded perspective view of the supporting and clamping means of the picture plane sheets.
Figure 5:
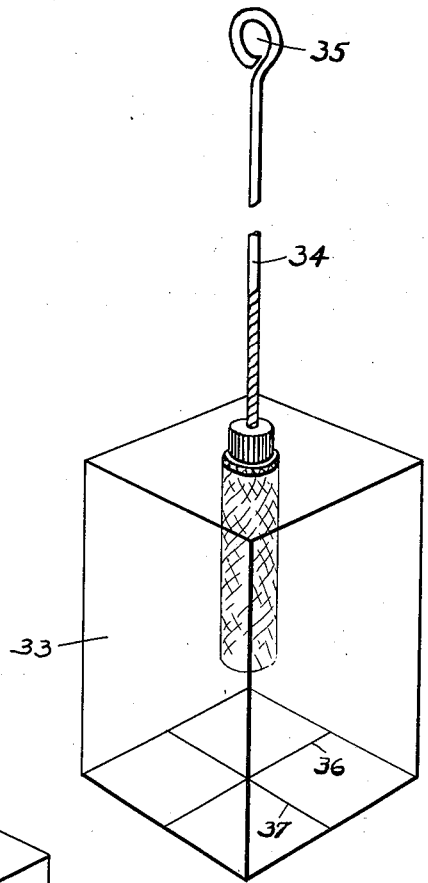
Figure 5 is a perspective view of the sight post.
Figure 6:
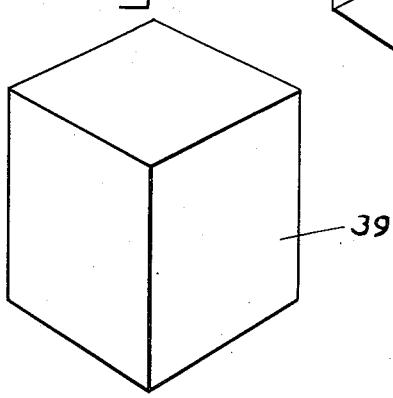
Figure 6 is a perspective view of a block forming the subject matter of the illustrated perspective.

Referring now to the drawings in detail, 10 indicates a box made of any suitable material, such as, for instance, wood, and has a cover 11 hingedly connected thereto as at 12—12. The cover 11 is provided with a pair of cut-outs 13 and 14 at its sides intermediate the ends thereof. The side walls 15 and 16 are each provided with holes in the area of the cover cut-outs for the reception of screws 17 held in place by wing nuts 18. The said screws form pivotal supporting means for a pair of clamping devices for securing one or more picture planes 19. The said clamping devices each comprise a strip or jaw 20 having a hole 21 for supporting same on the screw 17, and a strip or jaw 22 having holes 23 for slidably supporting same on dowel pins 24 extending from the strips 20. The picture planes are each provided at their side edges with holes 24ª which, if desirable, may be reinforced with eyelets 25 or the like. The position of the holes 24ª correspond to the location of the dowel pins 24 and to the tightening screw 26 which passes through holes 27 and 28 of the respective jaws 20 and 22 and are engaged by the said dowel pins 24 and screw 26. The jaw 22 is held in place by nuts 29.

In practice when erecting the device for demonstrating purposes, the cover 11 is lifted up part way and each of the jaws or strips 20 are pivoted into a vertical position on their respective screws 17, the cover closed and then the wing nuts 18 tightened. A ground plane 30 may then be supported on the lid or cover 11. The ground plane is so positioned on the cover 11 that a ground line 31 thereon coincides with the bottom edge of the picture plane 19 which may now be positioned on the dowels 24 of the jaws 20 and secured in place. The horizontal ground plane is further adjusted with respect to the vertical picture plane so as to bring a line of direction 32 in alinement with the vertical projection of the center of vision on the picture plane.

Located close to the near edge 30ª of the ground plane 30 is a sight or station point S. P. at which point is a transparent block 33 provided with an adjustably mounted post 34 terminating in an eye-loop 35. The block 33 is provided with lines 36 and 37 thereon for aiding in the positioning of the said block with respect to the ground plane station point. The eye-loop post is adjustable vertically so as to bring same in alinement with the eye level line 38 on the picture plane.

In the drawings the subject for illustration is a cube 39 shown in various positions and as drawn at a 45 degree angular perspective. The ground plane 30 has drawn thereon in plan view four positions of the said cube with its sides at an inclination of 45 degrees to the ground line. Position one is shown at 101 with one diagonal of a surface of the cube coinciding with the line of direction 32 and a corner of the surface on the ground line. Position two is shown at 102 and as spaced directly to the rear of the number one position and positions three and four at 103 and 104 on a line with position two spaced to the left and right, respectively. The ground line has marked thereon the vanishing points 40 and 41 connected by lines 42 and 43, respectively, to the sight or station point 44; measuring points R and L are located by arcs and the projection of the height line is located at point HL and points used in measuring various lines at 45 degrees to the ground line.

The picture plane 19 may comprise a single transparent sheet or a plurality of such sheets superposed or placed one next to the other. As shown, the picture plane comprises a sheet 45 upon which is drawn a 45 degree perspective 46 of the cube 39 in the number one position, and a second sheet 47 upon which are drawn perspectives 46ª, 46ᵇ, and 46ᶜ, corresponding respectively to the cube positions two, three and four. Instead of providing the last three drawings on one sheet, each position may be drawn on a separate sheet and placed one in front of the other or even further, the drawing of the cube in any one position may be built up by a series of sheets so as to demonstrate progressively the various successive steps. The circle 51 on the picture plane circumscribes the field of vision on the projection plane as produced by a 60 degree cone of vision with the apex at the eye point.

In demonstrating the theory of perspective drawing, the cube 39 may first be placed in the square or diamond 101 and may be viewed through the eye-loop 35. When so viewed the cube will be framed or coincide with the drawing 46 on the sheet 45. When the cube is placed at 102 or in the number two position it will be framed in the drawing 46ª on the picture plane sheet 47, when in the number three position it will be framed in drawing number 46ᵇ and in the number four position in drawing number 46ᶜ. Vanishing points 40ª and 41ª on the eye level line of the picture plane correspond respectively to the vanishing points 40 and 41 of the ground plane, and measuring points R and L on said eye level line correspond to the same points on the ground line of the ground plane.

It will be seen that due to the manner of mounting the picture plane supporting or clamping device, the same may be tilted and used to demonstrate the theory of perspectives of objects viewed at such a steep angle as to call for the use of a vanishing point for vertical lines. The device may also be used in the demonstration of ellipses.

When not in use the picture plane as well as its supporting means may be disassembled and placed in the box 10 which may be carried by a handle H on the front wall.

It is to be understood that the device is adapted for use in demonstrating and teaching the art of perspective at any angle, although it has been shown and described in connection with 45 degree perspectives.

It is apparent that the illustrations shown above have been given solely by way of illustration and not by way of limitation and that the above examples are subject to wide variations and modifications within the scope of the present invention. All such variations and modifications are to be included within the scope of the present invention.

What is claimed is:

1. A demonstrating apparatus, comprising a box-like structure having a horizontal top surface constituting a horizontal ground plane means forming a replaceable, vertical picture plane intermediate the ends of said ground plane, said means comprising one or more transparent sheets each provided with holes along the vertical edges thereof, a pivotal strip carried by the box like structure near each vertical edge of said picture plane, pins in the strips extending into the said holes, a second strip supported on said pins, and means passing through the said picture plane and strips for releasably securing the said elements together.

2. A demonstrating apparatus for teaching perspective drawing according to claim 1 in which the sight comprises a transparent block of rectangular cross section, a post terminating in an eye-loop vertically adjustable in the top of the block and adapted to bring the eye-loop in alignment with the eye level line on the picture plane, the base of the block having formed thereon right angle lines through the center and adapted to aid in positioning the eye-loop in alignment with the line of direction.

EDWIN E. RISSLAND.

REFERENCES CITED

The following references are of record in the file of this patent:

UNITED STATES PATENTS

| Number | Name | Date |
|---|---|---|
| 224,945 | O'Ryan | Feb. 24, 1880 |
| 1,210,608 | Dannenfelser | Jan. 2, 1917 |
| 2,410,447 | Juran | Nov. 5, 1946 |

FOREIGN PATENTS

| Number | Country | Date |
|---|---|---|
| 5,609 | Great Britain | Apr. 14, 1890 |
| 288,641 | Italy | Sept. 17, 1931 |